(12) United States Patent
Uemura et al.

(10) Patent No.: US 10,334,777 B2
(45) Date of Patent: Jul. 2, 2019

(54) ELECTRIC WORK VEHICLE

(71) Applicant: Kubota Corporation, Osaka-shi (JP)

(72) Inventors: Katsuhiko Uemura, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/825,282

(22) Filed: Nov. 29, 2017

(65) Prior Publication Data

US 2018/0338416 A1 Nov. 29, 2018

(30) Foreign Application Priority Data

May 24, 2017 (JP) ................. 2017-102822

(51) Int. Cl.
*B60K 1/00* (2006.01)
*A01D 34/00* (2006.01)
*A01D 34/64* (2006.01)
*A01D 34/68* (2006.01)
*B60K 1/04* (2019.01)
*B60L 11/18* (2006.01)
*A01D 34/78* (2006.01)
*A01D 69/02* (2006.01)

(52) U.S. Cl.
CPC .......... *A01D 34/008* (2013.01); *A01D 34/64* (2013.01); *A01D 34/6818* (2013.01); *A01D 34/78* (2013.01); *A01D 69/02* (2013.01); *B60K 1/04* (2013.01); *B60L 11/1801* (2013.01); *B60K 2001/0416* (2013.01); *B60Y 2200/223* (2013.01)

(58) Field of Classification Search
CPC ........ B60K 1/04; A01D 34/008; A01D 34/64; A01D 34/78
See application file for complete search history.

(56) References Cited

U.S. PATENT DOCUMENTS

| | | | | |
|---|---|---|---|---|
| 2,548,256 A | * | 4/1951 | Deo ................... | H01M 2/1083 180/68.5 |
| 2,607,433 A | * | 8/1952 | Simi ....................... | B60R 16/04 180/68.5 |
| 3,690,397 A | * | 9/1972 | Parker ..................... | B60K 1/04 180/19.1 |
| 5,275,525 A | * | 1/1994 | Grumblatt ................ | B60K 1/04 104/34 |
| 5,555,950 A | * | 9/1996 | Harada .................... | B60K 1/04 180/232 |
| 5,948,298 A | * | 9/1999 | Ijaz ...................... | B60L 11/1803 180/68.5 |
| 8,037,960 B2 | * | 10/2011 | Kiya ....................... | B60K 1/04 180/68.5 |
| 9,834,183 B2 | * | 12/2017 | Moskowitz ............... | B60S 5/06 |
| 2009/0145676 A1 | * | 6/2009 | Takasaki ................. | B60K 1/04 180/65.1 |

(Continued)

FOREIGN PATENT DOCUMENTS

JP 2013000115 A 1/2013

*Primary Examiner* — Hau V Phan
(74) *Attorney, Agent, or Firm* — The Webb Law Firm

(57) ABSTRACT

An electric work vehicle includes a carrier provided separately from a vehicle body for mounting/dismounting a battery, a carrier storage section provided in the vehicle body for attaching the carrier to the vehicle body, and an attachment mechanism for attaching/detaching the carrier to/from the carrier storage section.

7 Claims, 10 Drawing Sheets

(56) References Cited

U.S. PATENT DOCUMENTS

2010/0181129 A1*   7/2010   Hamidi ................... B60K 1/04
                                                   180/68.5
2013/0126254 A1*   5/2013   Lee ......................... B60K 1/04
                                                   180/68.5

* cited by examiner

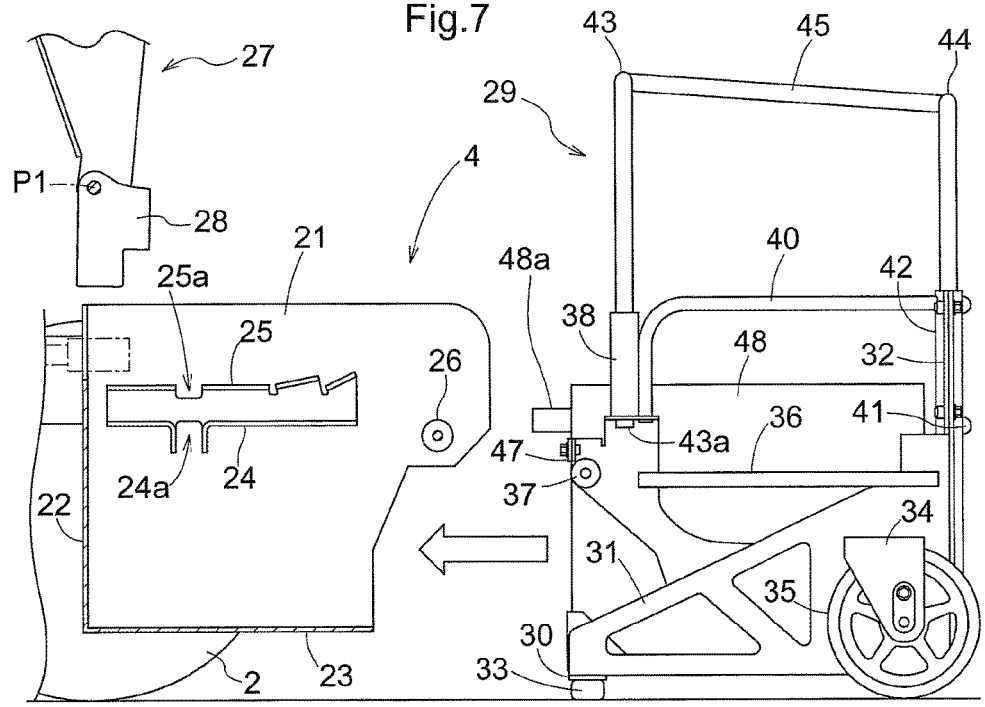
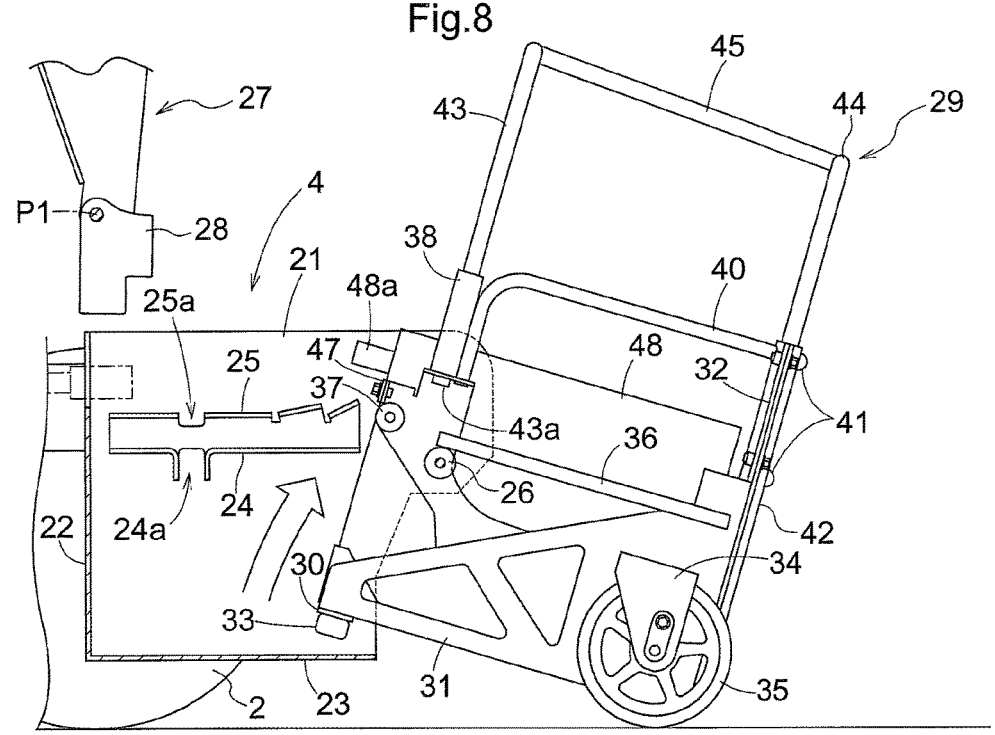

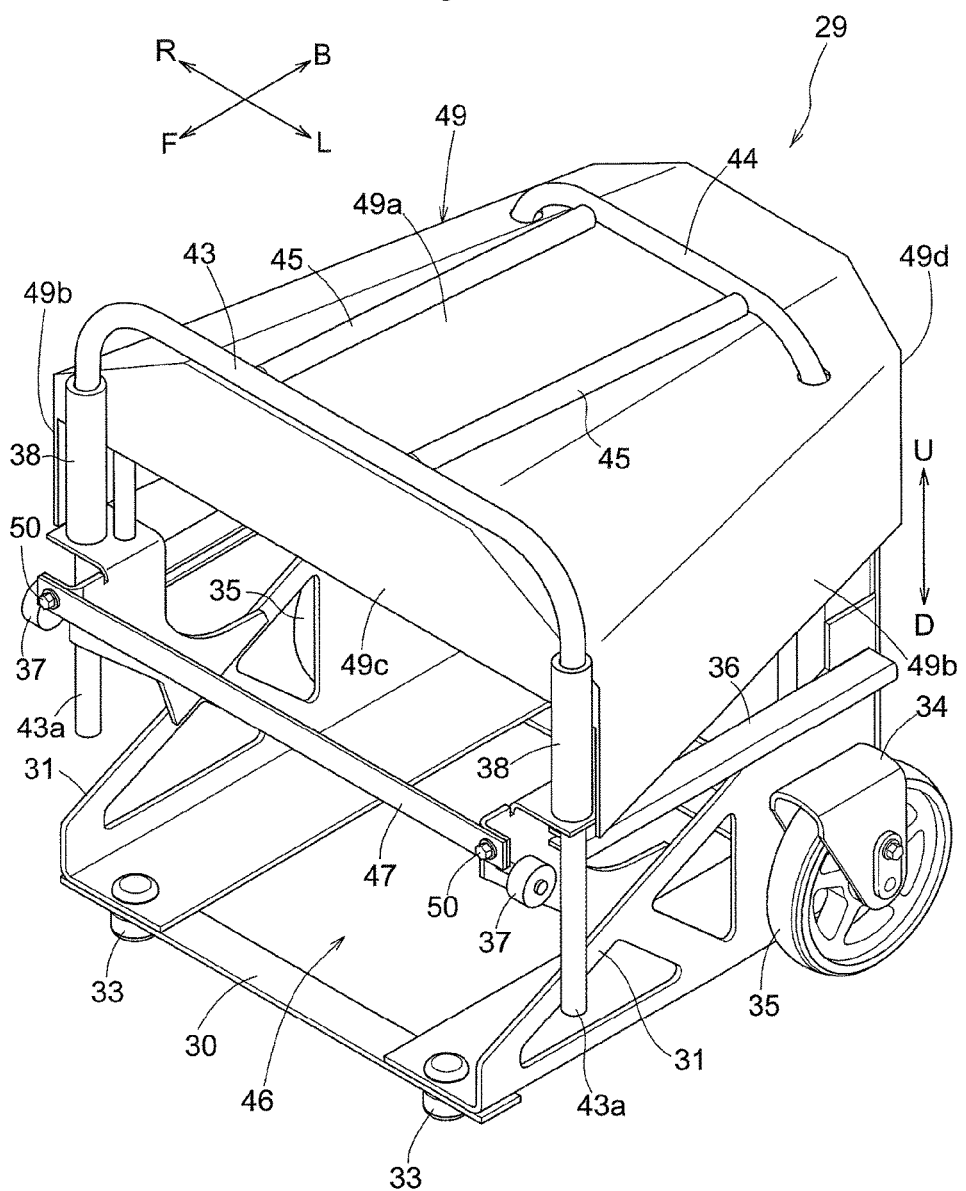

ELECTRIC WORK VEHICLE

CROSS-REFERENCE TO RELATED APPLICATION

This application claims priority to Japanese Patent Application No. 2017-102822 filed May 24, 2017, the disclosure of which is hereby incorporated in its entirety by reference.

BACKGROUND OF THE INVENTION

1. Field of the Invention

This invention relates to an electric work vehicle comprising a work vehicle such as a riding type grass mower, a tractor, etc. and mounting a battery for traveling and effecting utility work.

2. Description of the Related Art

As an example of an electric work vehicle, as disclosed in JP 2013-000115 A, there is known a riding type grass mower mounting a battery for traveling and effecting utility work. In JP 2013-000115 A, when the battery is used up, the used battery is removed and can be replaced by a charged battery.

In the electric work vehicle disclosed in JP 2013-000115 A, wheels for moving and a handle portion are provided in the battery and a connecting portion for connection of the battery to the vehicle body is also provided in the battery. As a result, even a heavy battery can be moved easily and the battery can be readily mounted to the vehicle body.

On the other hand, since the wheels for moving, the handle portion and the connecting portion are connected to the battery, this battery is configured as a special battery dedicated for use in a particular electric work vehicle. Namely, there remains room for improvement in the respect of versatility of battery.

SUMMARY OF THE INVENTION

In view of the above, there is proposed an electric work vehicle as under:

An electric work vehicle comprising:
a vehicle body;
a carrier provided separately from the vehicle body for mounting/dismounting a battery, the carrier having wheels for movement thereof;
a carrier storage section provided in the vehicle body for attaching the carrier to the vehicle body; and
an attachment mechanism for attaching/detaching the carrier to/from the carrier storage section.

With the above arrangement, by attaching the battery to the carrier having wheels for movement, the battery can be readily moved by the carrier. When the carrier with the battery attached thereto is moved to the carrier storage section of the vehicle body and the carrier is attached to the carrier storage section, the battery can be attached to the vehicle body via the carrier.

In this case, since the battery is attached to the vehicle body via the carrier, load occurring in the vehicle body will not be applied directly to the battery. Even if such load occurring in the vehicle body is applied to the battery, this load occurring in the vehicle body will be applied to the battery with the load being buffered by the carrier.

Further, the battery can be freely attached/detached to/from the carrier. With this, if e.g. carriers suitable for respective plurality of kinds of electric work vehicle are prepared, with attachment of one kind of battery to the plurality of kinds of carrier, it is possible to use one kind of battery for the plurality of kinds of electric work vehicles.

Conversely, for instance, with attachment/detachment of a plurality of kinds of battery to/from a carrier suitable for one type of electric work vehicle, it becomes possible to use a plurality of kinds of battery for one type of electric work vehicle.

As described above, with the inventive arrangement above, movement of the battery and attachment thereof to the vehicle body are facilitated; and also with effective suppression of direct application of a load occurring in the vehicle body to the battery, there is obtained an advantage in the respect of structural strength of the battery.

Moreover, with the ability of using a plurality of kinds of battery for one type of electric work vehicle in order to allow use of one kind of battery for a plurality of types of electric work vehicle, the versatility of the battery can be improved.

Next, preferred arrangements to be added to the above arrangement will be described respectively.

In one preferred embodiment, the carrier includes: an entrance/exit opening portion provided at a front portion in a carrier movement direction for effecting attachment/detachment of the battery to/from the carrier; and a fixing portion for fixing/releasing the battery to/from the carrier.

With the arrangement, for attaching the battery to the carrier, e.g. relative to the battery which is placed on a floor for instance, the carrier with its entrance/exit opening portion oriented forwardly is advanced, and the battery will be introduced into the carrier through the entrance/exit opening portion and then the fixing portion will be rendered into the fixing state. Conversely, for detaching the battery from the carrier, the fixing portion will be rendered into the releasing state and then the carrier is moved in reverse, whereby the battery of the carrier can be withdrawn and removed through the entrance/exit opening portion.

As described above, by causing the carrier to be moved forwardly or reversely, the battery can be easily attached/detached to/from the carrier. So, favorable operability can be obtained.

In another preferred embodiment, the carrier includes: a front side handle portion provided at a front portion in the carrier movement direction; and a rear side handle portion provided at a rear side in the carrier movement direction.

With the arrangement, when a worker moves the carrier, the provision of the handle portions in the carrier makes such movement of the carrier easy.

Further, when the worker moves the carrier by gripping the handle portion, the worker can grip the front side handle portion or the rear side handle portion or grip both the front side and rear side handle portions. Thus, favorable operability can be obtained.

In still another preferred embodiment, the electric work vehicle further comprises: a frame that interconnects the front side handle portion and the rear side handle portion, wherein, when the battery is attached to the carrier, the front side handle portion and the rear side handle portion are located upwardly of the battery.

With the arrangement, since the frame is connected to/between the front side handle portion and the rear side handle portion, rigidity of the front and rear side handle portions can be improved, whereby the rigidity of the carrier as a whole can be improved.

Further, the front and rear handle portions and the frame are located upwardly of the battery and the front and rear side handle portions and the frame function as a protector for the upper side of the battery. Thus, even when the carrier is turned over, the battery will be protected by the front and rear side handle portions and the frame.

In still yet another preferred embodiment, each of the front side handle portion and the rear side handle portion is configured to be extendible and contractible between a lowered position where the handle portion approaches the battery that is attached to the carrier, and an elevated position elevated from the lowered position.

With the arrangement, when the worker is to move the carrier by gripping the handle portion(s), by operating the handle portion to the elevated position, the worker can readily grip this handle portion, so that the movement of the carrier can be carried out easily.

Conversely, in case the carrier is attached to the carrier storage section, by operating the handle portion to the lowered position, this handle portion will not interfere with working traveling.

In another preferred embodiment, the electric work vehicle further comprises: a fixing mechanism for fixing/releasing the carrier to/from the vehicle body in the carrier storage section, wherein:

in response to an operation of the handle portion to the lowered position when the carrier is attached to the carrier storage section, the fixing mechanism is operated to a fixing state; and in response to an operation of the handle portion to the elevated position when the carrier is attached to the carrier storage section, the fixing mechanism is operated to a releasing state.

With the arrangement, when the handle portion is operated to the lowered position, with the carrier being attached to the carrier storage section, the fixing mechanism will be operated automatically into the fixing state, so improvement of operability can be obtained.

Further, when the carrier is to be detached from the carrier storage section, in response to an operation of the handle portion to the elevated position, the fixing mechanism will be operated automatically into the releasing state, so improvement of operability can be obtained.

In another preferred embodiment, the fixing mechanism comprises an engaging portion provided in the attachment mechanism; and in response to the operation of the handle portion to the lowered position when the carrier is attached to the carrier storage section, the handle portion comes into engagement with the engaging portion and thus the fixing mechanism is operated to the fixing state, and in response to the operation of the handle portion to the elevated position when the carrier is attached to the carrier storage section, the handle portion disengages from the engaging portion and thus the fixing mechanism is operated to the releasing state.

With the arrangement, by the simple arrangement of engagement/disengagement of the handle portion to/from the engaging portion of the attachment mechanism, the handle portion and the attachment mechanism can be utilized also as a part of the fixing mechanism. Thus, there is obtained an advantage in the respect of simplification of the arrangement.

With some electric work vehicles, the carrier storage section is provided between left and right rear wheels at a rear portion of the vehicle body.

In one preferred embodiment, therefore, the electric work vehicle further comprises:

right and left rear wheels supporting the vehicle body; and a cover body provided in the vehicle body to be operable between a closing position for covering the carrier storage section and an opening position upwardly distant from the closing position;

wherein the carrier storage section is disposed between the right and left rear wheels;

in response to an operation of the cover body to the opening position, the carrier is attachable/detachable to/from the carrier storage section from a rear side of the vehicle body; and a portion of the cover body corresponding to an upper side of the carrier storage section is opened.

With the arrangement, there is provided a cover body for covering the carrier storage section. Then, with this cover body being operated to the opening position, the carrier will be attached/detached to/from the carrier storage section from the rear side of the vehicle body. Since no portion in the cover body is located in opposition to the upper side of the carrier storage section, in comparison with an arrangement in which a certain portion in the cover body is located in opposition to the upper side of the carrier storage section, there can be obtained wider rear visibility, so that improvement in the maneuverability of the electric work vehicle can be obtained.

In another preferred embodiment, the electric work vehicle further comprises: a cover provided in the carrier for covering an upper portion of the battery.

With the arrangement, e.g. when the worker is to move the carrier, the upper portion of the battery is protected by the cover from raindrops, etc.

Further and other features and advantageous effects achieved thereby will become apparent upon reading the following explanation with reference to the accompanying drawings.

BRIEF DESCRIPTION OF THE DRAWINGS

FIGS. 7-12 are side views for explaining the carrier that supports the battery is to be attached and fixed in position to the carrier storage section, and FIG. 13 is an overall perspective view of a carrier according to a further embodiment.

DETAILED DESCRIPTION OF PREFERRED EMBODIMENTS

FIGS. 1-13 show an electric riding type grass mower as one example of an electric work vehicle. A mark [F] represents a "front direction" of a vehicle body 7, a mark [B] represents a "rear direction" of the vehicle body 7, a mark [U] represents an "upper direction" of the vehicle body 7, and a mark [D] represents a "lower direction" of the vehicle body 7, respectively. Further, a mark [R] represents a "right direction" of the vehicle body 7 and a mark [L] represents a "left direction" of the vehicle body 7, respectively.

(General Configuration of Riding Type Grass Mower)

Figure 1:
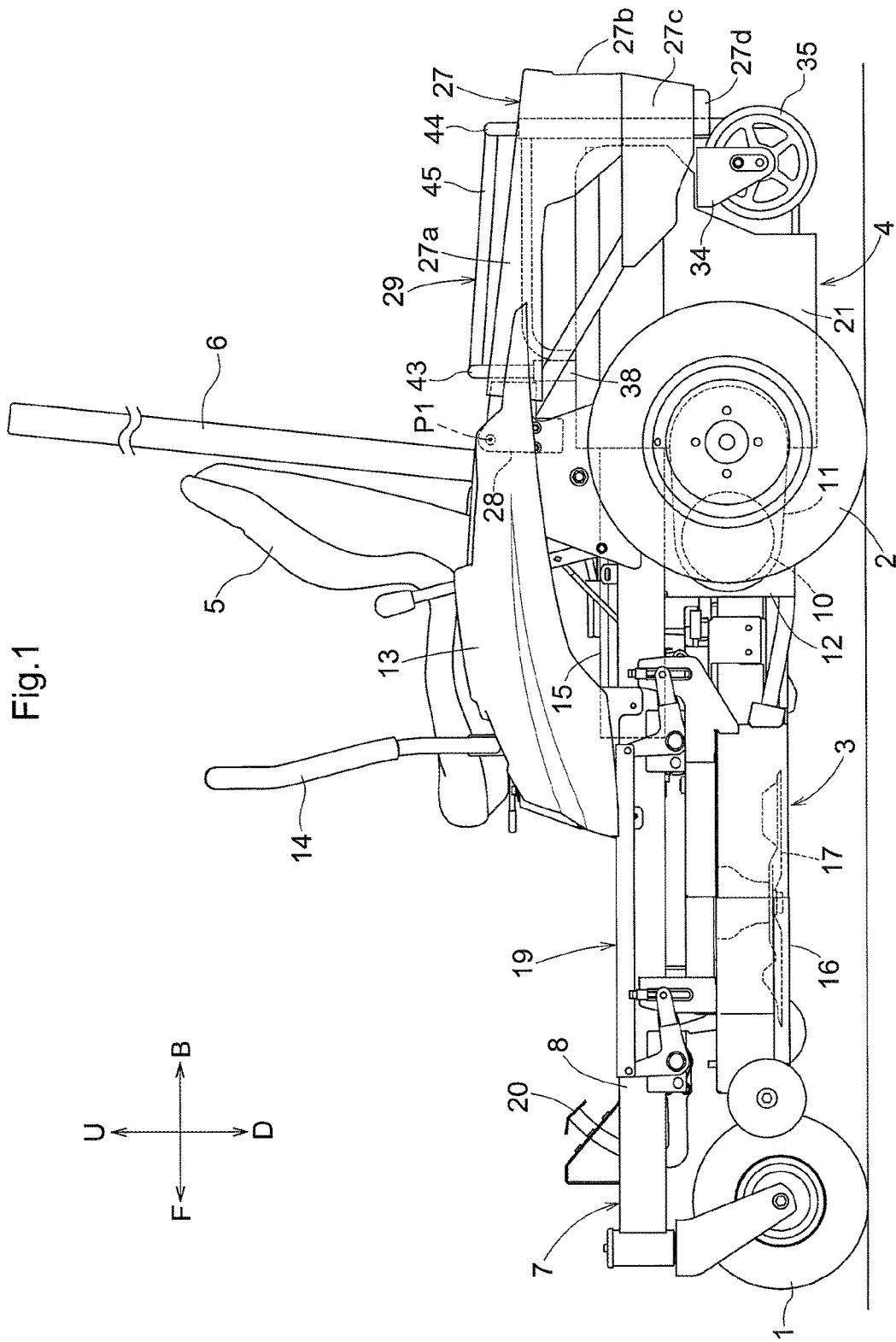
FIG. 1 is an overall side view of a riding type grass mower as one example of a work vehicle, according to one embodiment (same is true through to FIG. 13)
Figure 2:
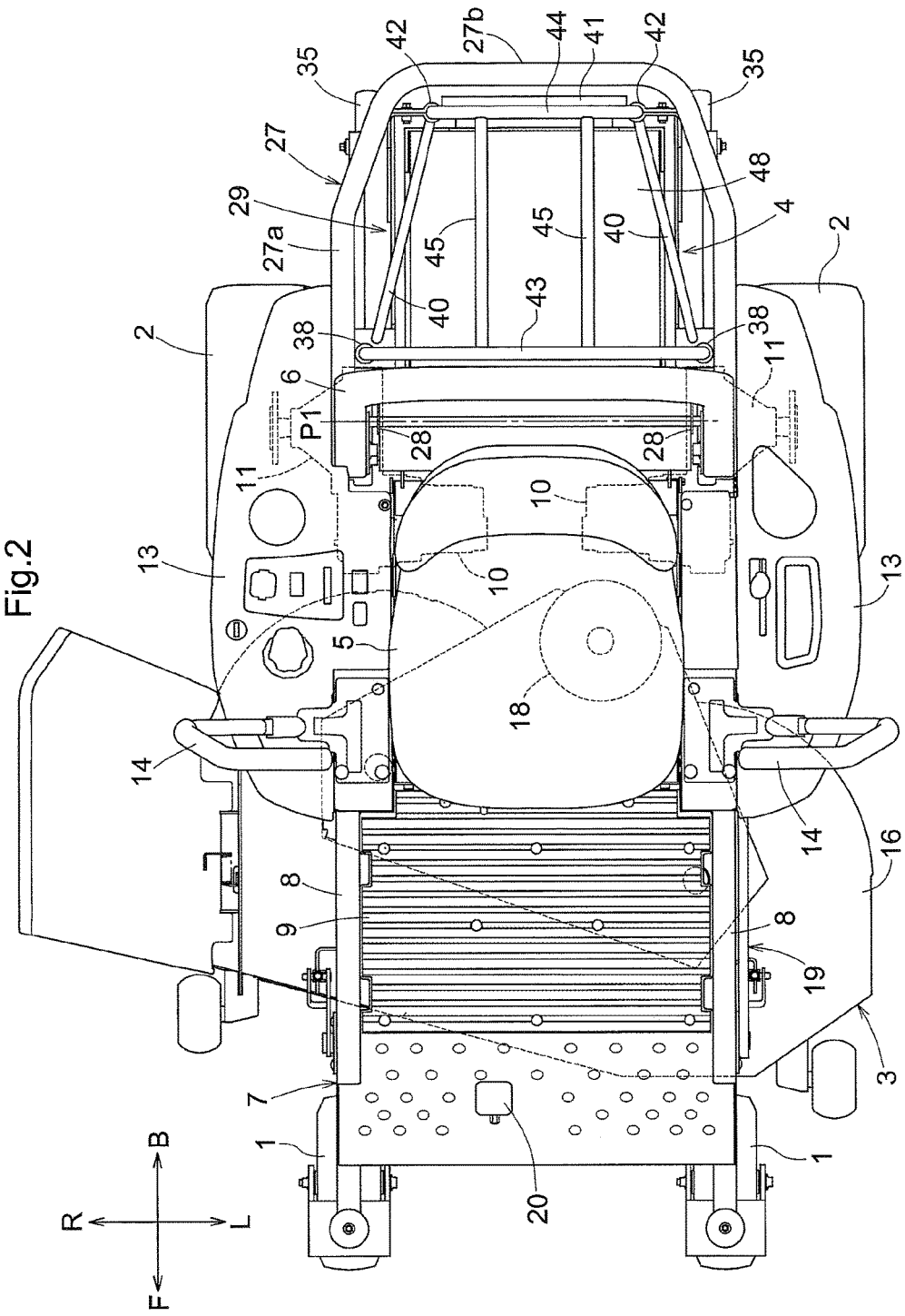
FIG. 2 is an overall plan view of the riding type grass mower.

As shown in FIG. 1 and FIG. 2, the riding type grass mower includes: right and left front wheels 1 supported at a front portion of the vehicle body 7; right and left rear wheels 2 supported at a rear portion of the vehicle body 7; a mower 3 supported at a lower portion of the vehicle body 7 between the front wheels 1 and the rear wheels 2; a carrier storage section 4 supported at a rear portion of the vehicle body 7 between the right and left rear wheels 2; and a driver's seat 5 and a rollover protection structure frame (to be referred to as "ROPS frame" hereinafter) 6 supported at upper portions of the vehicle body 7, etc.

As shown in FIG. 1 and FIG. 2, the vehicle body 7 includes: right and left vehicle body frames 8 extending along the front/rear direction of the vehicle body 7; and a floor 9 connected to/between the right and left vehicle body frames 8. The driver's seat 5 is supported at a rear portion of the floor 9, and a lower portion of the ROPS frame 6 is connected to the right and left vehicle body frames 8.

(Arrangements Relating to Front Wheels and Rear Wheels)

As shown in FIG. 1 and FIG. 2, the right and left front wheels 1 are of freely rotatable caster wheel type and are supported at front portions of the right and left vehicle frames 8.

As shown in FIG. 1 and FIG. 2, a support bracket 12 is connected to rear portions of the right and left vehicle frames 8; right and left electric motors 10 and speed reduction mechanisms 11 are connected to the support bracket 12; and the rear wheels 2 are supported at the speed reduction mechanisms 11. In operation, power of the electric motor 10 is transmitted via the speed reduction mechanism 11 to the rear wheel 2, and the right and left rear wheels 2 are rotatably driven independently of each other.

As shown in FIG. 1 and FIG. 2, right/left fenders 13 are provided upwardly of the right and rear wheels 2. And, right/left speed changer levers 14 are provided at front portions of the right/left fenders 13. Each speed changer lever 14 is operable from a neutral position to a forward side forwardly of the neutral position or a reverse side rearwardly of the neutral position. Downwardly of the driver's seat 5, there is provided a control device 15, and operational positions of the right and left speed changer levers 14 are inputted to this control device 15.

As shown in FIG. 1 and FIG. 2, when the right speed changer lever 14 is operated to the neutral position, the control device 15 renders the right electric motor 10 to a stop state. When the right speed changer lever 14 is operated to the forward side, the control device 15 causes the right electric motor 10 to operate in the forward side. When right speed changer lever 14 is operated to the reverse side, the control device 15 causes the right electric motor 10 to operate in the reverse side. The left electric motor 10 is operated similarly to the above.

As described above, with operations of the right and left speed changer levers 14, the right and left rear wheels 2 are driven to the forward side and the reverse side independently of each other, whereby forward traveling, reverse traveling and right and left turns can be effected.

(Configuration of Mower)

As shown in FIG. 1 and FIG. 2, the mower 3 includes a mower deck 16, and a cutter blade 17 supported inside the mower deck 16 to be rotatable about a vertical axis. And, this cutter blade 17 is rotatably driven by an electric motor 18.

As shown in FIG. 1 and FIG. 2, the mower 3 is supported by the vehicle body frames 8 via a link mechanism 19 to be liftable up/down. There are provided an electric actuator (not shown) for lifting the lift mechanism 19 up/down and an operational pedal 20 for operating the electric actuator.

When the operational pedal 20 is stepped on to operate the electric actuator, the mower 3 can be lifted up/down to a non-working position (see FIG. 1) elevated off the ground surface and a working position placed in contact with the ground surface.

(Configuration of Carrier Storage Section)

As shown in FIG. 1 and FIG. 2, the carrier storage section 4 is supported at a rear portion of the vehicle body 7 (the rear side of the driver's seat 5 and the ROPS frame 6) and between the right and left rear wheels 2.

Figure 3:
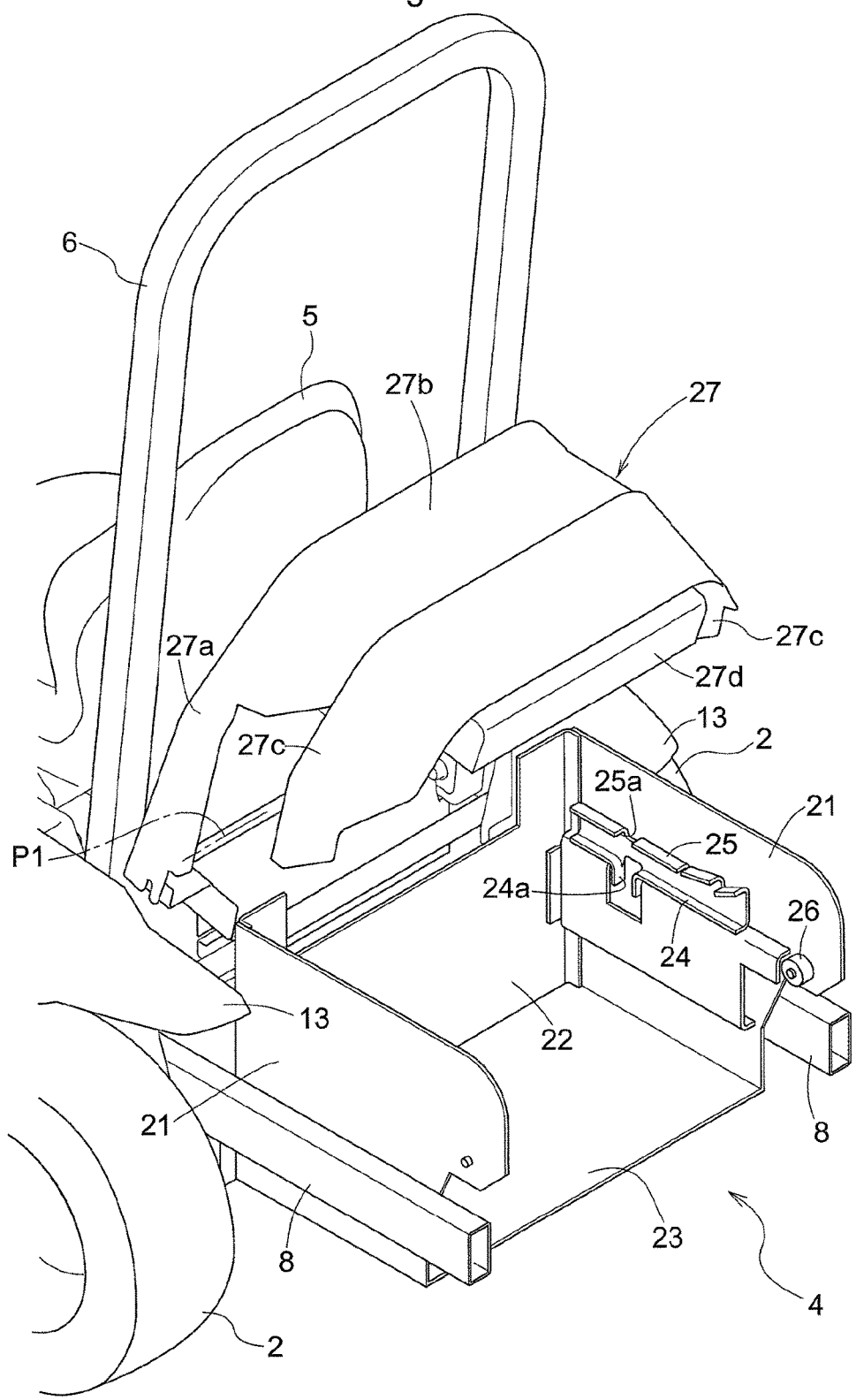
FIG. 3 is a perspective view showing vicinity of a carrier storage section.

As shown in FIG. 3, in the carrier storage section 4, right/left side portions 21 are connected to the rear portions of the right/left vehicle body frames 8, and a front portion 22 is connected to/between front portions of the right/left side portions 21. And, a lower portion 23 is connected to/between lower portions of the right/left side portions 21 and a lower portion of the front portion 22. With these, the upper side and the rear side of the carrier storage section 4 are opened to the outside.

As shown in FIG. 3, right/left first guiderails 24 (corresponding to an "attachment mechanism") extending along the front/rear direction are connected to the right/left side portions 21. To portions of the right/left side portions 21 located upwardly of the first guiderails 24, there are connected right/left second guiderails 25 (corresponding to the "attachment mechanism") extending along the front/rear direction.

As shown in FIG. 3, right and left opening portions 24a, 25a (corresponding to a "fixing mechanism" and corresponding to an "engaging portion"), which are opened in the vertical direction, are formed at front portions of the right/left first guiderails 24 and at front portions of the right/left second guiderails 25. Right/left rollers 26 are rotatably supported at portions of the right/left side portions 21 rearwardly of the first guiderails 1.

(Configuration of Cover Body for Covering Carrier Storage Section)

As shown in FIGS. 1, 2 and 3, there is provided a cover body 27 that covers the carrier storage section 4. The cover body 27 includes a frame portion 27a having a channel-shape in a plan view, a rear portion 27b connected to the rear portion of the frame portion 27a, right/left side portions 27c connected to right/left portions of the rear portion of the frame portion 27a, and a lower portion 27d connected to/between lower portions of the right/left side portions 27c.

As shown in FIGS. 1, 2 and 3, right/left support brackets 28 are connected to right/left lower portions of the ROPS frame 6; and the right/left front portions of the frame portion 27a of the cover body 27 are supported to be pivotable about a transverse axis P1 of right/left support brackets 28 extending in the left-right direction. With this, the cover body 27 is operable between a closing position (see FIG. 1 and FIG. 2) for covering the carrier storage section 4 and an opening position upwardly distant from the closing position (see FIG. 3).

As shown in FIG. 1 and FIG. 2, the cover body 27 has no portion that corresponds to its ceiling (the portion opposed to the upper side of the carrier storage section 4).

With the above arrangement, when the cover body 27 is operated to the closing position, the upper side of the carrier storage section 4 remains opened to the outside, whereas the rear side of the carrier storage section 4 is covered by the rear portion 27b, the side portions 27c and the lower portion 27d of the cover body 27.

(Configuration of Carrier)

A carrier 29 to be attached to the carrier storage section 4 will be described next.

Figure 4:
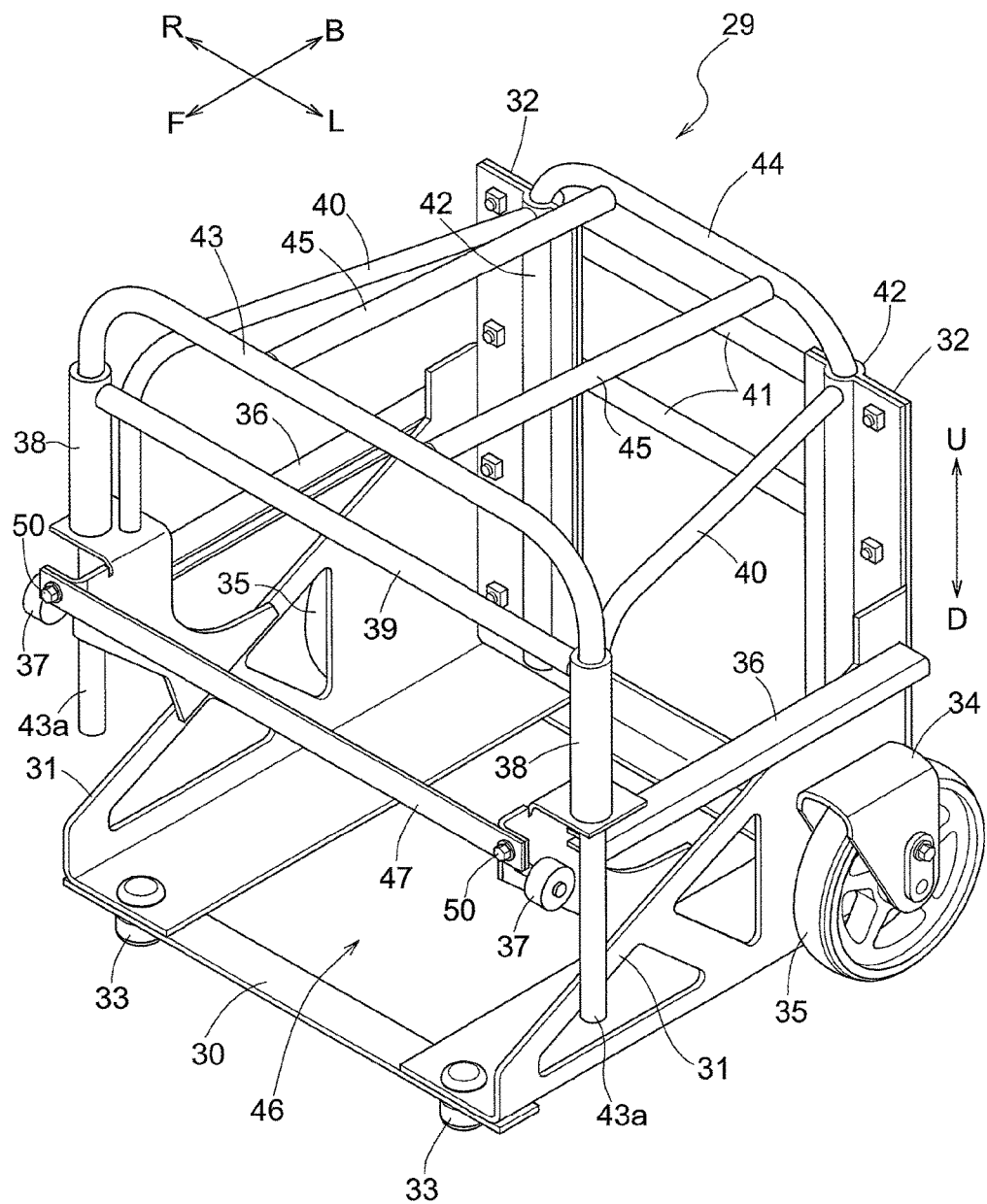
FIG. 4 is an overall perspective view of a carrier.

As shown in FIG. 4, the carrier 29 includes, as principal components thereof, a lower portion 30, vertically oriented right/left side portions 31 connected to right/left portions of the lower portion 30, and vertically oriented right/left rear portions 32 connected to a rear portion of the lower portion 30 and right/left rear portions of the side portions 31.

The lower portion 30 has a quadrangle-shape as seen in a plan view, and right/left leg portions 33 made of rubber are connected under downward orientation to right/left portions of the front portion of the lower portion 30.

As shown in FIG. 4, each side portion 31 has an X-shape as seen in its side view, and right/left wheels 35 for movement are rotatably supported at right/left support portions 34 connected to the rear portions of the side portions 31. Right/left guide portions 36 are connected at upper portions of the side portions 31 along the front/rear direction. And, right and left rollers 37 are rotatably supported at front portions of the upper portions of the side portions 31.

As shown in FIG. 4, right/left pipe portions 38 are connected to right/left front upper portions of the side portions 31; and a frame 39 is connected between the pipe portions 38. Right/left frames 40 are connected to/between the right/left pipe portions 38 and the right/left rear portions 32.

Upper and lower frames 41 are connected to/between the right/left rear portions 32, and the right/left rear portions 32 form right/left pipe portions 42.

As shown in FIG. 4, the front portion of the lower portion 30, the front portions of the side portions 31, the pipe portions 38 and the frame 39 together define an entrance/exit opening portion 46. To front portions of the side portions 31, a fixing portion 47 extending along the left-right direction is detachably attached by bolts 50.

As shown in FIG. 4, a front handle portion 43 having an arch-shape in its front view is vertically slidably inserted into the pipe portions 38. A rear handle portion 44 having an arch-shape in its front view is vertically slidably inserted into the pipe portions 42. To/between the handle portions 43, 44, right and left frames 45 are connected.

Figure 6:
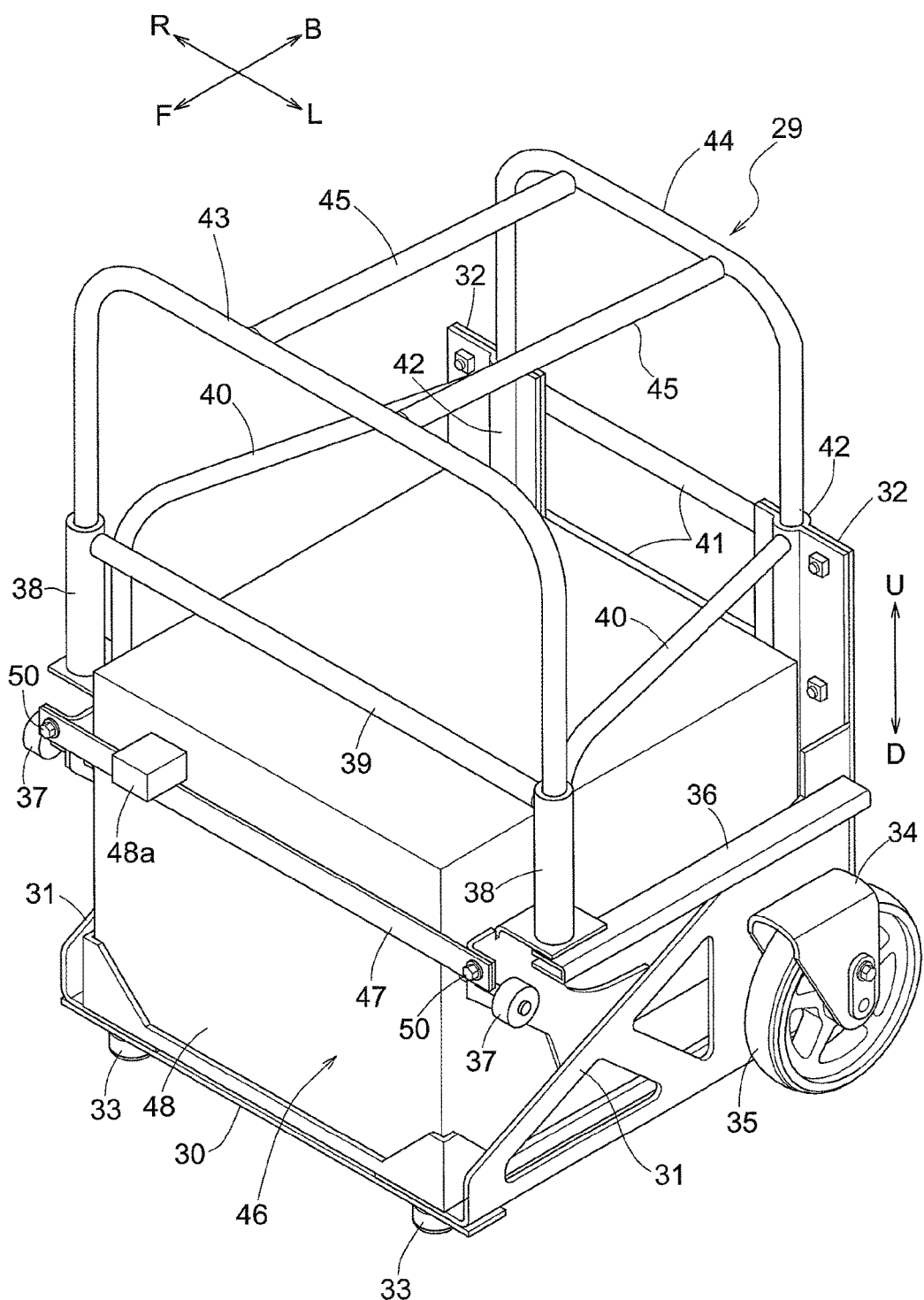
FIG. 6 is an overall perspective view of the battery and the carrier with the battery being attached to the carrier.

With the above-described arrangements, as shown in FIG. 4, at the front portion in the movement direction (front/rear direction) of the carrier 29, the front handle portion 43 is provided. At the rear portion in the movement direction (front/rear direction) of the carrier 29, the rear handle portion 44 is provided. As shown in FIG. 6, when the battery 48 is supported on the carrier 29, the handle portions 43, 44 and the frames 45 are located upwardly of this battery 48.

As shown in FIG. 4, the handle portions 43, 44 and the frames 45 are provided integrally in the carrier 29 to be extendible/contractible between a lowered position and an elevated position.

Figure 11:
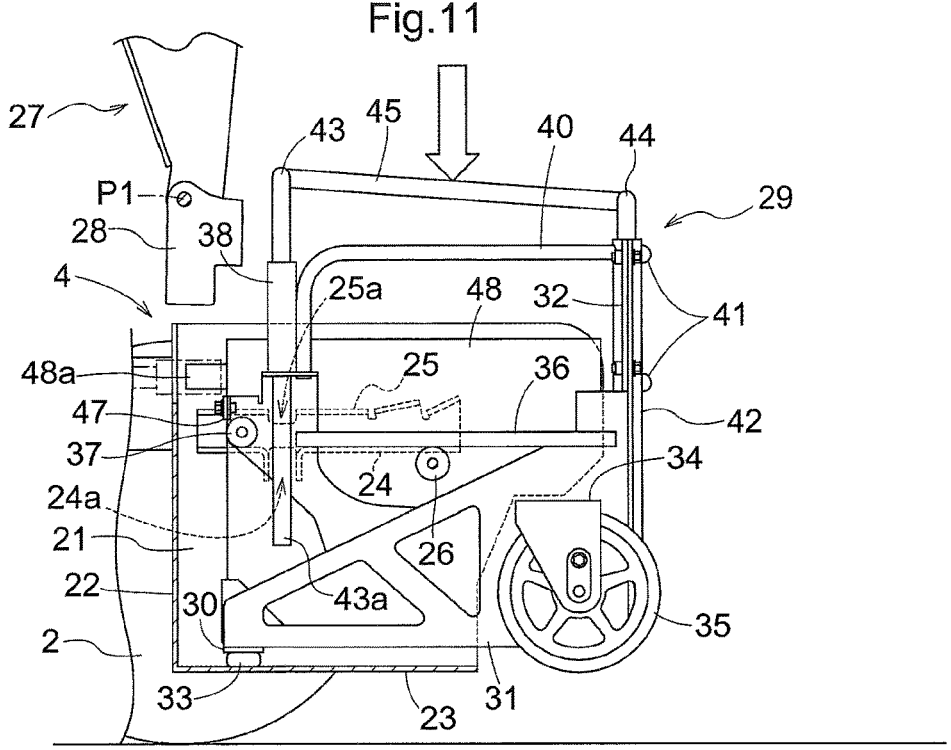
Figure 12:
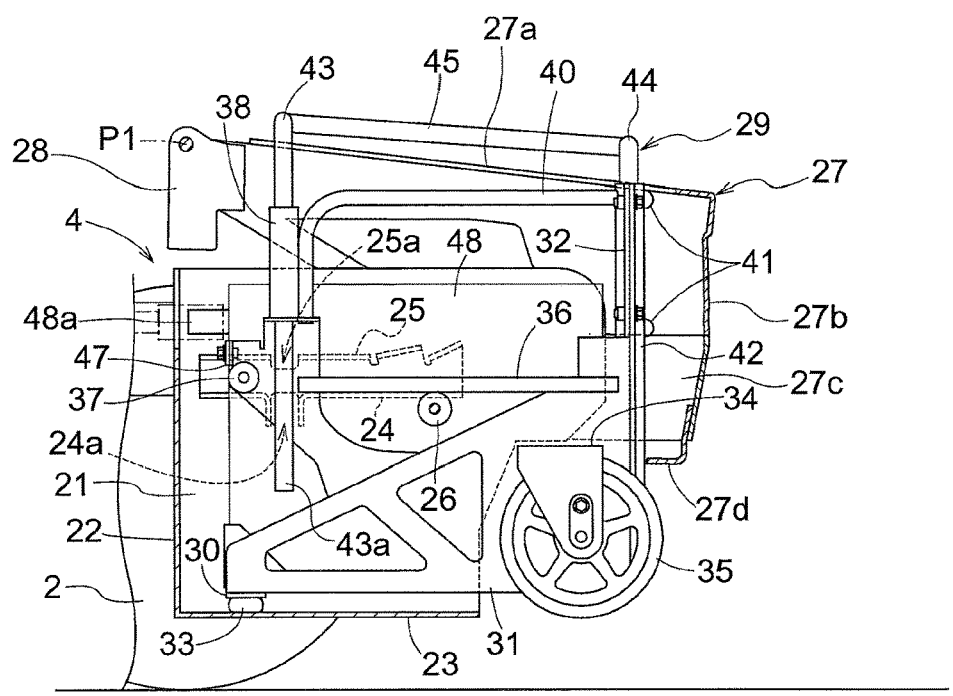

As shown in FIG. 11 and FIG. 12, when the handle portions 43, 44 and the frames 45 are set to the lowered position, the handle portions 43, 44 and the frames 45 are located adjacent to the battery 48 supported on the carrier 29. As shown in FIG. 6, the elevated position can be set by moving the handle portions 43, 44 and the frames 45 upwardly from the lowered position.

(Attachment of Battery to Carrier and Detachment of Battery from Carrier)

Figure 5:
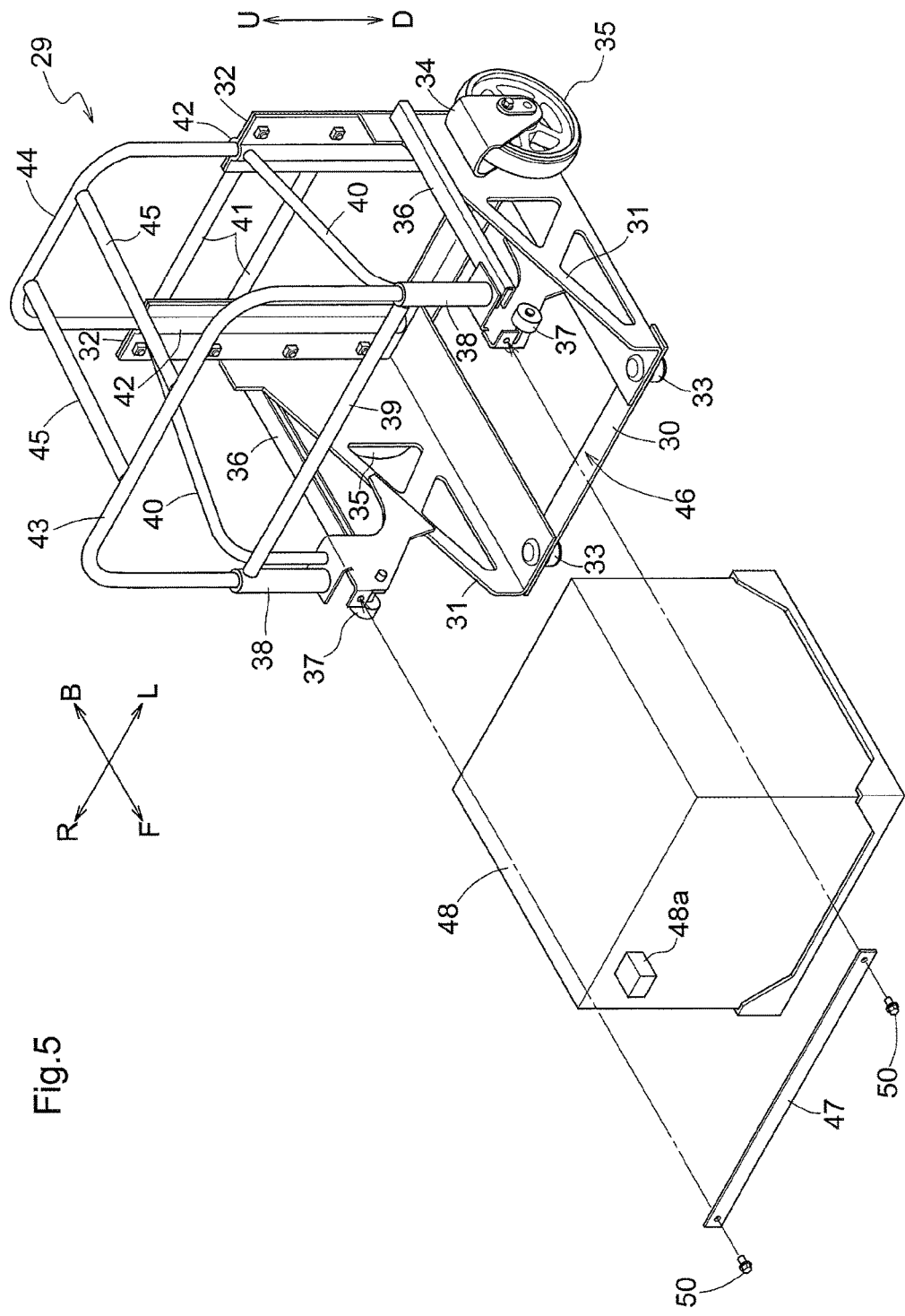
FIG. 5 is an overall perspective view of a battery and the carrier, illustrating the battery to be attached to the carrier.

As shown in FIG. 5, inside a box body having a cubic shape, many lithium ion battery cells (not shown), relays (not shown), a fuse (not shown), etc. are provided, thus together constituting the battery 48. At an upper portion of the front portion of the battery 48, a connecting terminal 48a is provided.

When the battery 48 is to be placed in and attached to the carrier 29, as shown in FIG. 5, the fixing portion 47 will be removed from the carrier 29, and the handle portions 43, 44 and the frames 45 will be set to the elevated position. Then, while the handle portions 43, 44 and the frames 45 are being held, and with orienting the entrance/exit opening portion 46 to the front side, the carrier 29 is caused to advance toward the rear portion of the battery 48 (the side opposite the connecting terminal 48a of the battery 48) placed on the floor surface.

As shown from FIG. 5 to FIG. 6, the battery 48 is to be introduced into the carrier 29 through the entrance/exit opening portion 46; and the battery 48 will be introduced into the carrier 29 until the battery 48 passes the lower side of the frames 39, 40 to reach the rear portions 32.

Thereafter, as shown in FIG. 6, by attaching the fixing portion 47 to the side portions 31 with the bolts 50, the battery 48 can be fixed to the carrier 29, thus realizing a state in which the battery 48 is attached to the carrier 29 (the state of being supported thereto).

When the battery 48 is to be removed and detached from the carrier 29, as shown from FIG. 6 to FIG. 5, the fixing portion 47 will be removed (releasing state of the fixing portion 47), while the handle portions 43, 44 and the frames 45 are being held, the carrier 29 is caused to move in reverse, and the battery 48 will be withdrawn through the entrance/exit opening portion 46 and detached from the carrier 29.

As described above, when the battery 48 is introduced to and attached to the carrier 29, and when the battery 48 is withdrawn and detached from the carrier 29, the same operations as above can be carried out also when the handle portions 43, 44 and the frames 45 are set to the lowered position (see FIG. 4).

(Attachment of Carrier Supporting Battery to Carrier Storage Section)

Next, there will be explained regarding attachment of the carrier 29, having the battery 48 supported thereon, to the carrier storage section 4 after the battery 48 is attached to the carrier 29 as described above.

As shown in FIG. 7, the cover body 27 will be operated to the opening position in advance. Then, in the carrier 29 supporting the battery 48, the handle portions 43, 44 and the frames 45 will be set to the elevated position and then the lower portions 43a (corresponding to the "fixing mechanism") of the handle portions 43, 44 will be located upwardly of the guide portions 36 in advance.

As shown in FIG. 7, while the handle portions 43, 44 and the frame 45 are being held, the carrier 29 will be caused to advance from the rear side of the vehicle body 7 toward the carrier storage section 4, with the entrance/exit opening portion 46 (the connecting terminal 48a of the battery 48) being oriented to the front side.

As shown in FIG. 8, when the carrier 29 reaches the carrier storage section 4, the front portion of the carrier 29 will be elevated and the rollers 37 of the carrier 29 will be inserted from the rollers 26 of the carrier storage section 4 and between the first guiderails 24 and the second guiderails 25, and the front portions of the guide portions 36 of the carrier 29 will be placed onto the rollers 26 of the carrier storage section 4.

Figure 9:
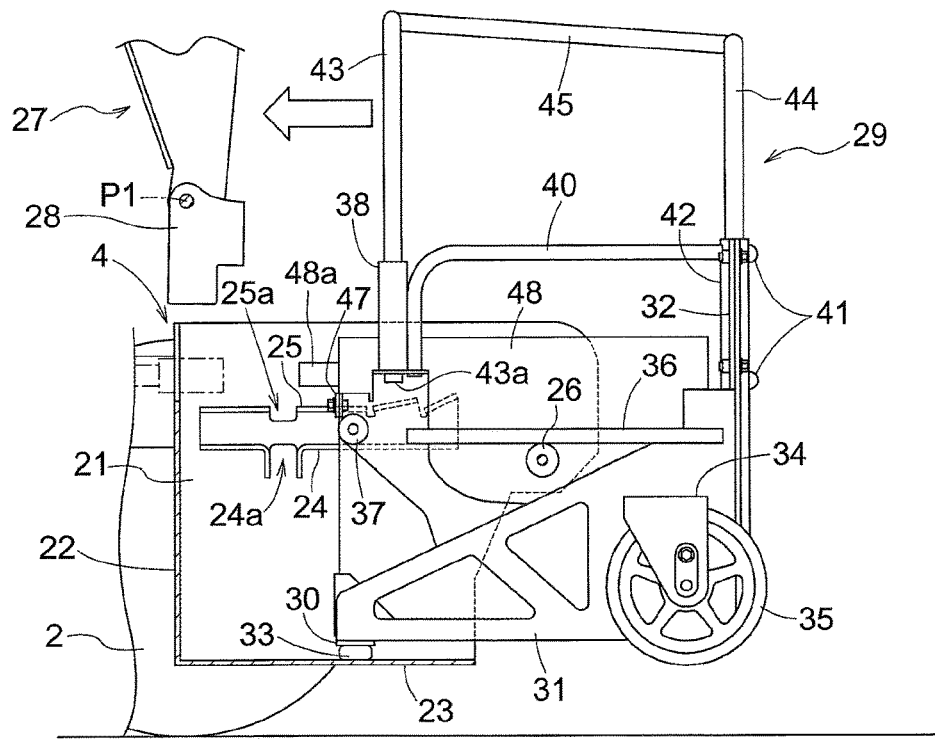

As shown in FIG. 9, the rear portion of the carrier 29 will be elevated and the carrier 29 will be pushed to the forward side to be introduced into the carrier storage section 4. The guide portions 36 of the carrier 29 will pass between the first guiderails 24 and the second guiderails 25 of the carrier storage section 4, and the lower portions 43a of the handle portions 43 of the carrier 29 will pass the upper side of the second guiderails 25 of the carrier storage section 4.

In this case, as shown in FIG. 9, the posture of the carrier 29 should be maintained such that the guide portions 36 of the carrier 29 and the lower portions 43a of the handle portions 43 will not come into contact with the first guiderails 24 or the second guiderails 25 of the carrier storage section 4.

With the above arrangement, the weight of the carrier 29 is supported via the rollers 37 by the first guiderails 24 of the carrier storage section 4, and the carrier 29 will be moved to the forward side while the rollers 37 of the carrier 29 roll on the first guiderails 24 of the carrier storage section 4. Therefore, the carrier 29 can be introduced smoothly into the carrier storage section 4.

Figure 10:
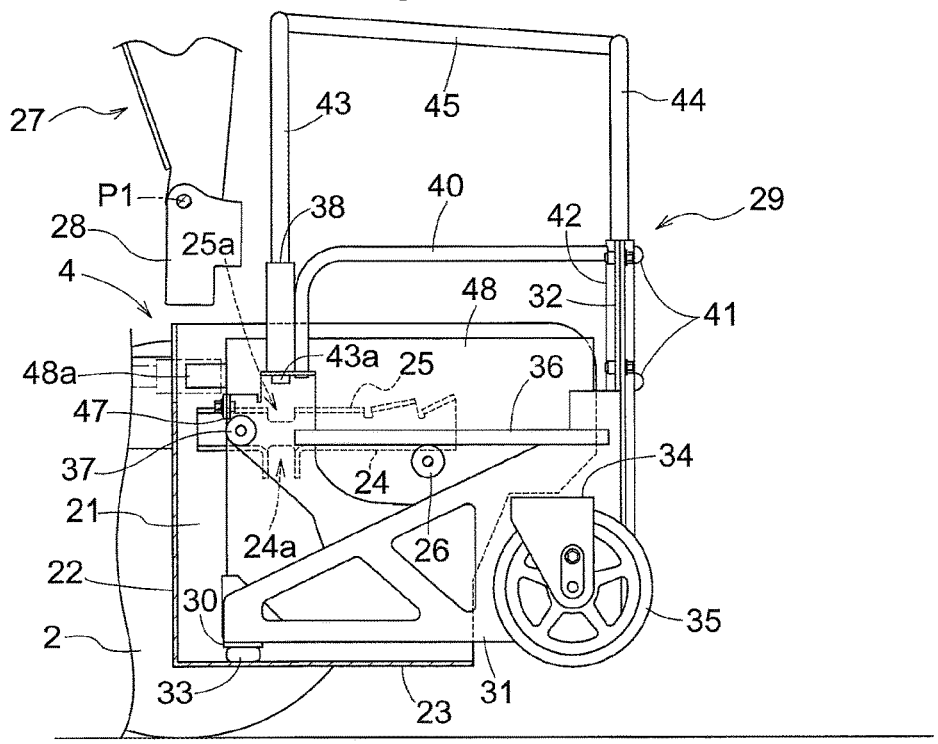

As shown in FIG. 10, when the carrier 29 reaches the front portion 22 of the carrier storage section 4, the pushing operation of the carrier 29 will be stopped and the guide portions 36 of the carrier 29 will be placed on the first guiderails 24 of the carrier storage section 4. Whereby, the weight of the carrier 29 will be supported by the first guiderails 24 of the carrier storage section 4 via the rollers 37 and the guide portions 36.

As shown in FIG. 10, when the carrier 29 reaches the front portion 22 of the carrier storage section 4, the lower portions 43a of the handle portions 43 of the carrier 29 will be located upwardly of the openings 24a, 25a of the first guiderails 24 and the second guiderails 25 of the carrier storage section 4.

As shown in FIG. 11, when the handle portions 43, 44 and the frames 45 of the carrier 29 are set to the lowered position, the lower portions 43a of the handle portions 43 of the carrier 29 will enter the opening portions 24a, 25a of the first guiderails 24 and the second guiderails 25 of the carrier storage section 4.

With the above, the handle portions 43 of the carrier 29 will be engaged with the first guiderails 24 and the second guiderails 25 of the carrier storage section 4, so that the carrier 29 is fixed to the carrier storage section 4 (corresponding to the fixing state of the fixing mechanism).

A harness (not shown) will be connected to/between the control device 15 and the connecting terminal 48a of the battery 48, and as shown in FIG. 12, the cover body 27 will be operated to the closing position.

In this case, since the cover body 27 has no portion which corresponds to its ceiling (portion opposed to the upper side of the carrier storage section 4), as shown in FIGS. 1, 2 and 12, when the cover body 27 is operated to the closing position, the upper sides of the carrier 29 and the battery 48 (the carrier storage section 4) remain opened, and the handle portions 43, 44 and the frames 45 of the carrier 29 protrude slightly above the cover body 27 as seen in a side view.

Whereas, the rear sides of the carrier 29 and the battery 48 (the carrier storage section 4) are covered by the rear portion 27b, the side portions 27c and the lower portion 27d of the cover body 27.

(Detachment of Carrier Supporting Battery from Carrier Storage Section)

When the carrier 29 supporting the battery 48 is to be detached from the carrier storage section 4, as will be described below, reverse operations to those described in the above section (attachment of carrier supporting battery to carrier storage section) will be effected.

Namely, as shown in FIG. 12 and FIG. 11, the cover body 27 will be operated to the opening position and the harness connecting the control device 15 to the connecting terminal 48a of the battery 48 will be removed.

Then, the handle portions 43, 44 and the frames 45 of the carrier 29 will be operated to the elevated position, and the lower portions 43a of the handle portions 43 of the carrier 29 will be withdrawn upwards from the first guiderails 24 and the second guiderails 25 of the carrier storage section 4.

Whereby, as shown in FIG. 10, the engagement between the handle portions 43 of the carrier 29 and the first guiderails 24 and the second guiderails 25 of the carrier storage section 4 will be released, thus releasing the fixation of the carrier 29 to the carrier storage section 4 (corresponding to the releasing state of the fixing mechanism).

As shown in FIG. 10 and FIG. 9, the rear portion of the carrier 29 will be elevated slightly and the carrier 29 will be pulled to the rear side to be withdrawn from the carrier storage section 4. In this case, the posture of the carrier 29 should be maintained such that the guide portions 36 of the carrier 29 and the lower portions 43a of the handle portions 43 will not come into contact with the first guiderails 24 or the second guiderails 25 of the carrier storage section 4.

With the above arrangement, as shown in FIG. 9, the weight of the carrier 29 is supported via the rollers 37 by the first guiderails 24 of the carrier storage section 4, and the carrier 29 will be moved to the rear side while the rollers 37 of the carrier 29 roll on the first guiderails 24 of the carrier storage section 4. Therefore, the carrier 29 can be withdrawn smoothly from the carrier storage section 4.

As shown in FIG. 9 and FIG. 8, when the rollers 37 of the carrier 29 reach the rear portions of the first guiderails 24 of the carrier storage section 4, the rear portion of the carrier 29 will be lowered to bring the wheels 35 of the carrier 29 into contact with the ground surface.

Next, as shown in FIG. 8 and FIG. 7, the carrier 29 kept under its forwardly elevated posture will be caused to move to the rear side, to separate the rollers 37 of the carrier 29 rearwardly away from the first guiderails 24, and then the front portion of the carrier 29 will be lowered back to the state shown in FIG. 7.

Other Embodiments

[1] As shown in FIG. 13, the carrier 29 may have a cover 49 for covering the upper portion of the battery 48.

As shown in FIG. 13, the cover 49 includes an upper portion 49a, right and left side portions 49b, a front portion 49c and a rear portion 49d. The side portions 49b of the cover 49 are connected to upper portions of the side portions 31. And, the pipe portions 38, as shown in FIG. 4, are connected to the outer front portions of the side portions 49b of the cover 49.

As shown in FIG. 13, on the inner portions of the rear portion 49d of the cover 49, the pipe portions 42 as shown in FIG. 4 are provided. And, in the pipe portions 38, 42, the handle portions 43, 44 as shown in FIG. 4 are vertically slidably inserted.

As shown in FIG. 13, the lower side portion of the front portion 49c of the cover 49 is set to the same height as the frame 39 shown in FIG. 4, and the lower side portion of the front portion 49c of the cover 49 forms the upper side portion of the entrance/exit opening portion 46.

[2] The carrier 29 may have four wheels 35 as being supported at the front portion and the rear portion of the respective side portions 31. In this case, they can be caster type wheels 35.

The fixing portion 47 can be attached to/between the front portion of the lower portion 30 and the frame 39 (or the front portion 49c of the cover 49).

The handle portions 43, 44 may be provided at the right portion and the left portion of the carrier 29 along the front/rear direction.

The carrier storage section 4 may be provided at a front portion of the vehicle body 7 between the right and left front wheels 1, such that the carrier 29 may be configured to be attachable/detachable to/from the carrier storage section 4 from the front side of the vehicle body 7. With this arrangement, a utility implement (not shown) can be supported to the rear portion of the vehicle body 7.

The opening portions 24*a*, 25*a* may be provided at rear portions of the first guiderails 24 and the second guiderails 25. Whereby, in response to an operation of the handle portions 43, 44 and the frames 45 to the lowered position, the lower portion of the rear handle portion 44 will enter the opening portions 24*a*, 25*a* of the first guiderails 24 and the second guiderails 25, thus obtaining a fixing state of the fixing mechanism.

The cover body 27 may be provided with a portion that corresponds to its ceiling (portion opposed to the upper side of the carrier storage section 4).

[3] The present invention is applicable not only to a riding type grass mower, but also to another electric work vehicle such as a tractor, etc. that mounts a battery and effects a work implement operation while traveling.

What is claimed is:

1. An electric work vehicle comprising:
    a vehicle body;
    a carrier provided separately from the vehicle body for mounting/dismounting a battery, the carrier having wheels for movement thereof;
    a carrier storage section provided in the vehicle body for attaching the carrier to the vehicle body;
    an attachment mechanism for attaching/detaching the carrier to/from the carrier storage section; and
    a fixing mechanism for releasably connecting the carrier to the carrier storage section, the fixing mechanism comprising:
        a handle portion on the carrier, the handle portion movable between a lowered position and an elevated position; and
        an engaging portion on the attachment mechanism,
    wherein:
    in response to movement of the handle portion to the lowered position when the carrier is attached to the carrier storage section, the handle portion engages the engaging portion to fix the carrier to the carrier storage section, and
    in response to movement of the handle portion to the elevated position when the carrier is attached to the carrier storage section, the handle portion disengages the engaging portion to release the carrier to the carrier storage section.

2. The electric work vehicle according to claim 1, wherein:
    the carrier includes:
        an entrance/exit opening portion provided at a front portion in a carrier movement direction for effecting attachment/detachment of the battery to/from the carrier; and
        a fixing portion for fixing/releasing the battery to/from the carrier.

3. The electric work vehicle according to claim 1, wherein the handle portion includes:
    a front side handle portion provided at a front portion in the carrier movement direction; and
    a rear side handle portion provided at a rear side in the carrier movement direction.

4. The electric work vehicle according to claim 3, further comprising:
    a frame that interconnects the front side handle portion and the rear side handle portion,
    wherein, when the battery is attached to the carrier, the front side handle portion and the rear side handle portion are located upwardly of the battery.

5. The electric work vehicle according to claim 3, wherein:
    each of the front side handle portion and the rear side handle portion is configured to be extendible and contractible between a lowered position where the handle portion approaches the battery that is attached to the carrier, and an elevated position elevated from the lowered position.

6. The electric work vehicle according to claim 1, further comprising:
    right and left rear wheels supporting the vehicle body; and
    a cover body provided in the vehicle body to be operable between a closing position for covering the carrier storage section and an opening position upwardly distant from the closing position;
    wherein the carrier storage section is disposed between the right and left rear wheels;
    in response to an operation of the cover body to the opening position, the carrier is attachable/detachable to/from the carrier storage section from a rear side of the vehicle body; and
    a portion of the cover body corresponding to an upper side of the carrier storage section is opened.

7. The electric work vehicle according to claim 1, further comprising:
    a cover provided in the carrier for covering an upper portion of the battery.

* * * * *